US009049764B2

(12) United States Patent
Yang et al.

(10) Patent No.: US 9,049,764 B2
(45) Date of Patent: *Jun. 2, 2015

(54) LED DRIVE CIRCUIT WITH A PROGRAMMABLE INPUT FOR LED LIGHTING

(71) Applicant: SYSTEM GENERAL CORP., Taipei Hsien (TW)

(72) Inventors: Ta-Yung Yang, Milpitas, CA (US); Chuh-Ching Li, Taoyuan County (TW); Ming-Chieh Lee, Pingtung County (TW); Kuo-Hsien Huang, Taipei County (TW)

(73) Assignee: System General Corp., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,613

(22) Filed: Apr. 25, 2014

(65) Prior Publication Data

US 2014/0232284 A1   Aug. 21, 2014

Related U.S. Application Data

(63) Continuation of application No. 12/978,836, filed on Dec. 27, 2010, now Pat. No. 8,742,677.

(51) Int. Cl.
*H05B 33/08* (2006.01)

(52) U.S. Cl.
CPC ........... *H05B 33/0815* (2013.01); *Y02B 20/347* (2013.01)

(58) Field of Classification Search
USPC ............... 315/247, 185 S, 224, 291, 307–326
See application file for complete search history.

(56) References Cited

U.S. PATENT DOCUMENTS

| 6,977,824 | B1 | 12/2005 | Yang et al. |
|---|---|---|---|
| 7,616,461 | B2 | 11/2009 | Yang et al. |
| 8,222,832 | B2 * | 7/2012 | Zheng et al. .................. 315/291 |
| 8,466,628 | B2 * | 6/2013 | Shearer et al. ............ 315/209 R |
| 2008/0048633 | A1 | 2/2008 | Li et al. |
| 2008/0278092 | A1 * | 11/2008 | Lys et al. ...................... 315/247 |
| 2011/0175543 | A1 * | 7/2011 | Sun et al. ...................... 315/291 |
| 2012/0025736 | A1 * | 2/2012 | Singh et al. .................. 315/307 |

* cited by examiner

*Primary Examiner* — Tuyet Vo
(74) *Attorney, Agent, or Firm* — Rosenberg, Klein & Lee

(57) ABSTRACT

A LED drive circuit according to the present invention comprises a controller and a programmable signal. The controller generates a switching signal coupled to switch a magnetic device for generating an output current to drive a plurality of LEDs. The programmable signal is coupled to regulate a current-control signal of the controller. The switching signal is modulated in response to the current-control signal for regulating the output current, and the level of the output current is correlated to the current-control signal.

23 Claims, 6 Drawing Sheets

LED DRIVE CIRCUIT WITH A PROGRAMMABLE INPUT FOR LED LIGHTING

REFERENCE TO RELATED APPLICATION

This reference is being filed as a Continuation Application of patent application Ser. No. 412/978,836, filed 27 Dec. 2010, currently pending.

BACKGROUND OF THE INVENTION

1. Filed of Invention

The present invention relates to a LED lighting, and more particularly, the present invention relates to a switching regulator with programmable input.

2. Description of Related Art

The LED driver is used to control the brightness of the LED in accordance with its characteristics. The LED driver is also utilized to control the current that flows through the LED. The present invention provides a primary-side controlled switching regulator with a programmable input for a LED driver. One object of this invention is to improve the power factor (PF) of the LED driver. The programmable input can also be used for the dimming control. It s another object of the invention.

SUMMARY OF THE INVENTION

It is an objective of the present invention to provide a LED drive circuit with programmable input. It can modulate the switching signal to regulate the output current for improving the power factor (PF) of the LED drive circuit.

It is an objective of the present invention to provide a LED drive circuit with programmable input. The programmable input can be used for the dimming control.

The LED drive circuit according to the present invention comprises a controller and a programmable signal. The controller generates a switching signal coupled to switch a magnetic device for generating an output current to drive a plurality of LEDs. The programmable signal is coupled to regulate a current-control signal of the controller. The switching signal is modulated in response to the current-control signal for regulating the output current. The level of the output current is correlated to the current-control signal. Further, the programmable signal is coupled to control a reference signal of the controller. The switching signal is modulated in response to the reference signal. The level of the output current is correlated to the reference signal.

The LED driver according to the present invention comprises a controller and a programmable signal. The controller generates a switching signal coupled to switch a transformer for generating a current input signal coupled to the controller and an output current connected to drive a plurality of LEDs. The programmable signal is coupled to modulate the current input signal. The current input signal is further coupled to generate a current-control signal. The current input signal is correlated to a switching current of the transformer. The switching signal is controlled in response to the current-control signal. The level of the output current is correlated to the current-control signal.

BRIEF DESCRIPTION OF ACCOMPANIED DRAWINGS

The accompanying drawings are included to provide a further understanding o the present invention, and are incorporated in and constitute a part of this specification. The drawings illustrate embodiments of the present invention and, together with the description, serve to explain the principles of the present invention. In the drawings, FIG. 1 shows a circuit diagram of a preferred embodiment of a LED drive circuit in accordance with the present invention.

DETAILED DESCRIPTION OF PREFERRED EMBODIMENTS

Figure 1:
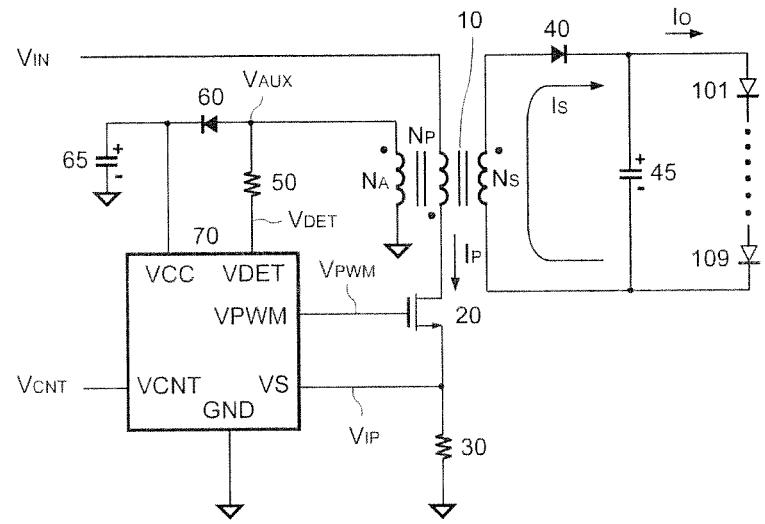

FIG. 1 is a circuit diagram of a preferred embodiment of a LED drive circuit in accordance with the present invention. The LED drive circuit, which is presently preferred to be a LED circuit or a LED driver. An offline transformer 10 is a magnetic device including a primary winding $N_P$, an auxiliary winding $N_A$ and a secondary winding $N_S$. One terminal of the primary winding $N_P$ is coupled to receive an input voltage $V_{IN}$. The other terminal of the primary winding $N_P$ is coupled to a drain terminal of a power transistor 20. The power transistor 20 is utilized to switch the offline transformer 10. One terminal of the secondary winding $N_S$ connects one terminal of a rectifier 40. A filter capacitor 45 is coupled between the other terminal of the rectifier 40 and the other terminal of the secondary winding $N_S$. A plurality of LEDs 101-109 are connected in series and connected to the filter capacitor 45 in parallel.

A controller 70 comprises a supply terminal VCC, a voltage-detection terminal VDET, a ground terminal GND, a current-sense terminal VS, an input terminal VCNT and an output terminal VPWM. The controller 70 is a primary-side controller that is coupled to control the power transistor 20 for switching the primary winding $N_P$ of the magnetic device. The voltage-detection terminal VDET is coupled to the auxiliary winding $N_A$ via a resistor 50 to receive a voltage-detection signal $V_{DET}$ for detecting a reflected voltage $V_{AUX}$. The voltage-detection signal $V_{DET}$ is correlated to the reflected voltage $V_{AUX}$. The reflected voltage $V_{AUX}$ further charges a capacitor 65 via a rectifier 60 for powering the controller 70. The capacitor 65 is coupled to the supply terminal VCC of the controller 70.

The current-sense terminal VS is coupled to a current-sense resistor 30. The current-sense resistor 30 is coupled from a source terminal of the power transistor 20 to a ground for converting a switching current $1_p$ of the magnetic device to a current input signal $V_{IP}$. The switching current $I_P$ flows the power transistor 20. The output terminal VPWM outputs a switching signal $V_{PWM}$ to switch the offline transformer 10. The controller 70 generates the switching signal $V_{PWM}$ to switch the magnetic device through the power transistor 20 for generating an output current $I_O$ and controlling the switching current $I_P$. The output current $I_O$ is coupled to drive LEDs 101-109. The input terminal VCNT receives a programmable signal $V_{CNT}$ to control the switching current $I_P$ and the output current $I_O$.

Figure 2:
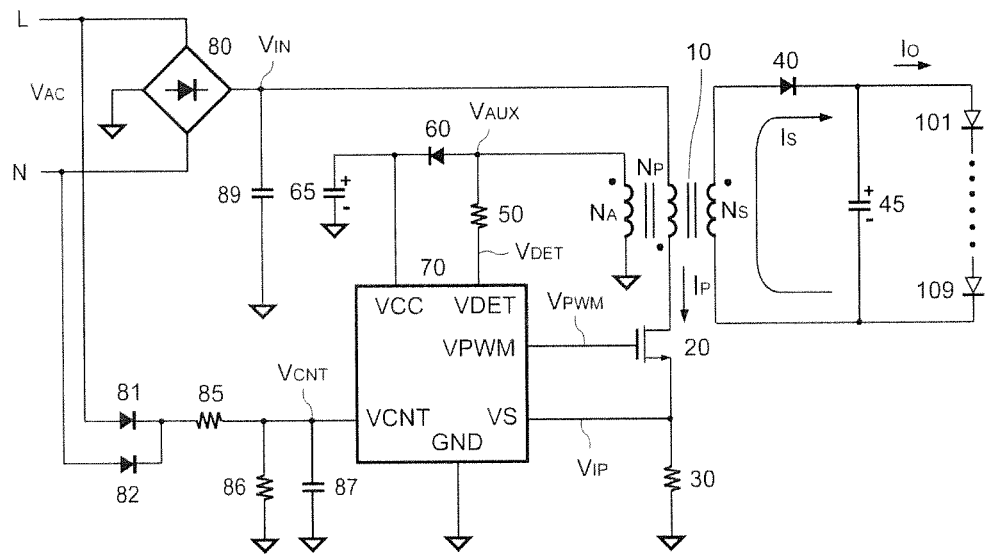
FIG. 2 is another preferred embodiment of the LED drive circuit in accordance with the present invention.

FIG. 2 is another preferred embodiment of the LED drive circuit in accordance with the present invention. Comparing with FIG. 1 and FIG. 2, the primary winding $N_P$ is coupled to receive the input voltage $V_{IN}$ rectified and filtered by a bridge rectifier 80 and a bulk capacitor 89 from an AC input $V_{AC}$. The AC input $V_{AC}$ is coupled to an input of the bridge rectifier 80. The bulk capacitor 89 is coupled between an output of the bridge rectifier 80 and the ground. Moreover, the programmable signal $V_{CNT}$ is generated at the input terminal VCNT in response to the AC input $V_{AC}$ of the LED drive circuit through diodes 81 and 82, a voltage divider formed by resistors 85 and 86, a filter capacitor 87. Anodes of the diodes 81 and 82 are coupled to receive the AC input $V_{AC}$. One terminal of the resistor 85 is coupled to cathodes of the diodes 81 and 82. The resistor 86 is connected between the other terminal of the resistor 85 and the ground. The filter capacitor 87 is connected to the resistor 86 in parallel. The filter capacitor 87 is further coupled to the input terminal VCNT. Other circuits of this embodiment are the same as the embodiment of FIG. 1, so here is no need to describe again.

Figure 3:
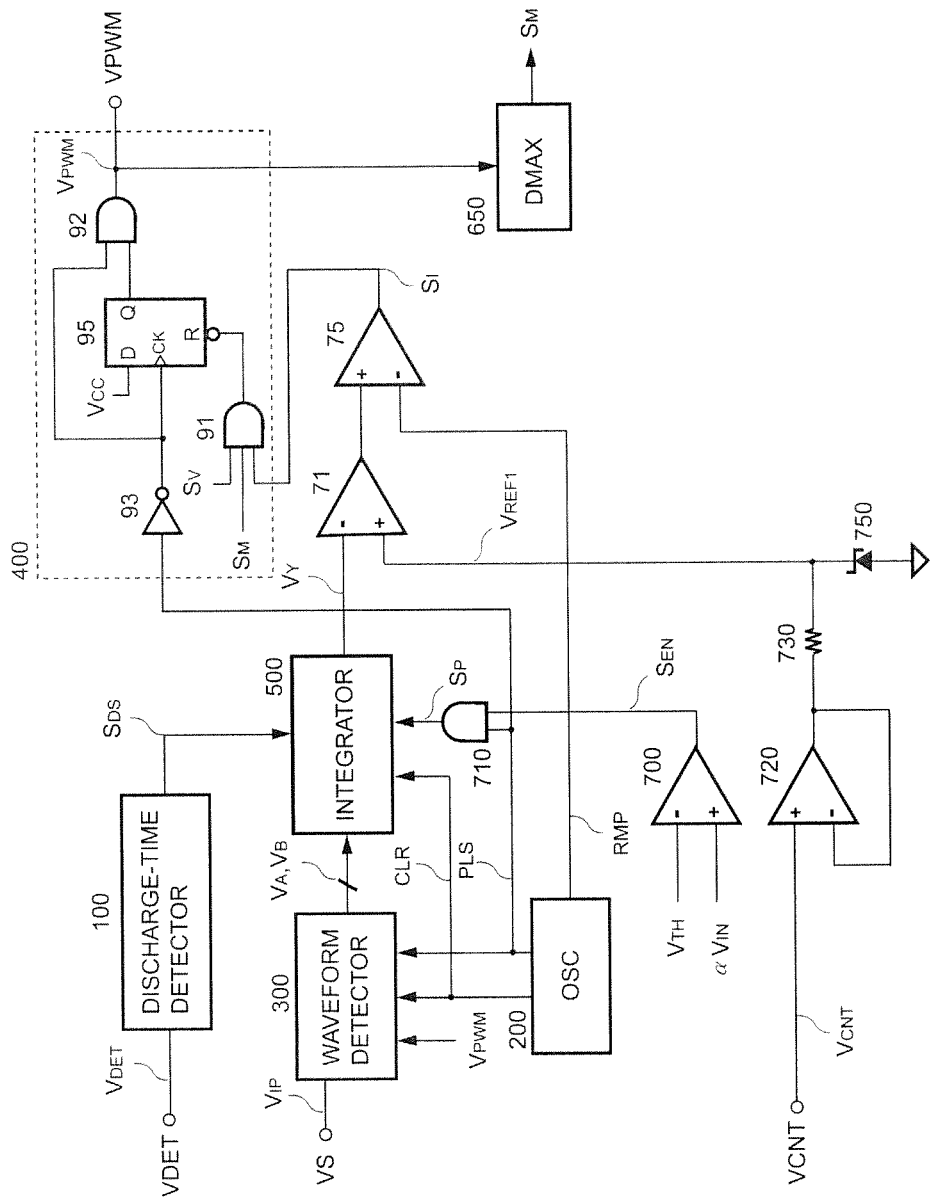
FIG. 3 is a preferred embodiment of the controller in accordance with the present invention.

FIG. 3 is a preferred embodiment of the controller in accordance with the present invention. The controller 70 is a primary-side controller coupled to switch the primary winding $N_P$ of the offline transformer 10. The detail description of the primary-side controlled regulator can be found in a prior art "Control circuit for controlling output current at the primary side of a power converter" U.S. Pat. No. 6,977,824.

A waveform detector 300 detects the witching current $I_P$ (as shown in FIG. 1) and generates current-waveform signals $V_A$ and $V_B$ by sampling the current input signal $V_{IP}$ through the current-sense terminal VS. The waveform detector 300 further receives the switching signal $V_{PWM}$, a pulse signal PLS and a clear signal CLR. A discharge-time detector 100 receives the voltage-detection signal $V_{DET}$ via the auxiliary winding $N_A$ (as shown in FIG. 1) to detect the discharge-time of a secondary side switching current $I_S$ and generate a discharge-time signal $S_{DS}$. The secondary side switching current $I_S$ is proportional to the switching current $I_P$. The pulse width of the discharge-time signal $S_{DS}$ is correlated to the discharge-time of the secondary side switching current $I_S$. The output current $I_O$ is correlated to the secondary side switching current $I_S$. An oscillator (OSC) 200 generates the pulse signal PLS coupled to a PWM circuit 400 to determine the switching frequency of the switching signal $V_{PWM}$. The oscillator 200 further generates the clear signal CLR that is coupled to the waveform detector 300 and an integrator 500.

Figure 4:
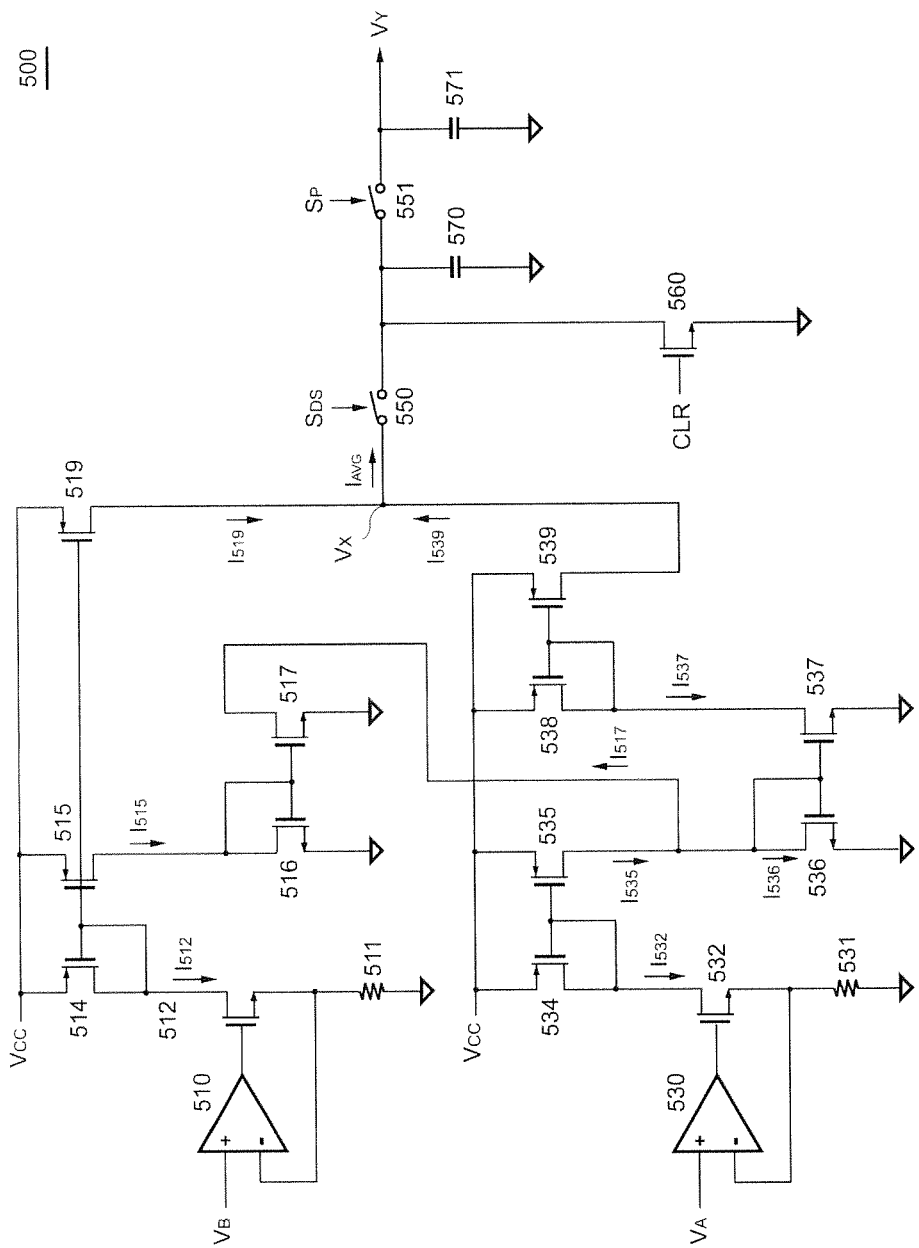
FIG. 4 is a preferred embodiment of the integrator in accordance with the present invention.

The integrator 500 is used to generate a current signal $V_Y$ by integrating an average current signal $I_{AVG}$ (as shown in FIG. 4) with the discharge-time signal $S_{DS}$. The average current signal $I_{AVG}$ is produced in response to the current-waveform signals $V_A$ and $V_B$. A time constant of the integrator 500 is correlated with a switching period T of the switching signal $V_{PWM}$. The current signal $V_Y$ is therefore related to the output current $I_O$. An operational amplifier 71 and a reference signal $V_{REF1}$ develop an error amplifier for output current control. A positive input of the operational amplifier 71 is coupled to receive the reference signal $V_{REF1}$. A negative input of the operational amplifier 71 is coupled to receive the current signal $V_Y$. The error amplifier amplifies the current signal $V_Y$ and provides a loop gain for output current control.

A comparator 75 is associated with the PWM circuit 400 for controlling the pulse width of the switching signal $V_{PWM}$ in response to an output of the error amplifier. A positive input and a negative input of the comparator 75 are coupled to receive the output of the error amplifier and a ramp signal RMP respectively. The ramp signal RMP is provided by the oscillator 200. An output of the comparator 75 generates a current-control signal $S_I$ for controlling the pulse width of the switching signal $V_{PWM}$. A current control loop is formed from detecting the switching current $I_P$ to modulate the pulse width of the switching signal $V_{PWM}$. The current control loop controls the magnitude of the switching current $I_P$ in response to the reference signal $V_{REF1}$.

The PWM circuit 400 outputs the switching signal $V_{PWM}$ for switching the offline transformer 10. The PWM circuit 400 according to one embodiment of the present invention comprises a D flip-flop 95, an inverter 93, an AND gate 91 and an AND gate 92. A D input of the D flip-flop 95 is supplied with a supply voltage $V_{CC}$. An output of the inverter 93 is coupled to a clock input CK of the D flip-flop 95. The pulse signal PLS sets the D flip-flop 95 through the inverter 93. An output Q of the D flip-flop 95 is coupled to a first input of the AND gate 92. A second input of the AND gate 92 is coupled to the output of the inverter 93 and receives the pulse signal PLS through the inverter 93. An output of the AND gate 92 is also an output of the PWM circuit 400 that generates the switching signal $V_{PWM}$. The D flip-flop 95 is reset by an output of the AND gate 91.

A first input of the AND gate 91 is supplied with a voltage-control signal $S_V$. The voltage-control signal $S_V$ is generated by a voltage control loop, in which the voltage control loop is utilized to regulate the output voltage $V_O$. A second input of the AND gate 91 is coupled to receive the current-control signal $S_I$ for achieving output current control. A third input of the AND gate 91 is coupled to receive a maximum-duty signal $S_M$. The voltage-control signal $S_V$, the current-control signal $S_I$ and the maximum-duty signal $S_M$ can reset the D flip-flop 95 for shorten the pulse width of the switching signal $V_{PWM}$ so as to regulate the output voltage $V_O$ and the output current $I_O$. The maximum-duty signal $S_M$ is generated by a maxi um duty circuit (DMAX) 650. The maximum duty circuit 650 can be utilized to limit the maximum-duty of the switching signal $V_{PWM}$ under 50%.

A positive input of a comparator 700 is coupled to receive a detect signal $\alpha V_{IN}$. A low-voltage threshold $V_{TH}$ is supplied with a negative input of the comparator 700. An enable signal $S_{EN}$ is generated at an output of the comparator 700 by comparing the detect signal $\alpha V_{IN}$ with the low-voltage threshold $V_{TH}$. The detect signal $\alpha V_{IN}$ is correlated to the input voltage $V_{IN}$. The output of the comparator 700 generates the enable signal $S_{EN}$ coupled to control an AND gate 710. Two inputs of the AND gate 710 receives the pulse signal PLS and the enable signal $S_{EN}$ respectively. An output of the AND gate 710 generates a sample signal Sp coupled to the integrator 500. The detail description for input voltage $V_{IN}$ detection can be found in prior arts "Control method and circuit with indirect input voltage detection by switching current slope detection" U.S. Pat. No. 7,616,461 and "Detection circuit to detect input voltage of transformer and detection method for the same" US 2008/0048633 A1.

The programmable signal $V_{CNT}$ generated at the input terminal VCNT is supplied to a positive input of a buffer amplifier 720. A negative input of the buffer amplifier 720 is connected to its output. A resistor 730 is coupled between the output of the buffer amplifier 720 and a reference voltage device 750. The reference voltage device 750 is connected to the reference signal $V_{REF1}$ to clamp the maximum voltage of the reference signal $V_{REF1}$. The reference voltage device 750 can be implemented by a zener diode. The programmable signal $V_{CNT}$ is coupled to regulate the current-control signal $S_I$ of the controller 70 through controlling the reference signal $V_{REF1}$ of a current-loop. Furthermore, the programmable signal $V_{CNT}$ is coupled to control the reference signal $V_{REF1}$ of the current-loop of the controller 70. The switching signal $V_{PWM}$ is modulated in response to the current-control signal $S_I$ for regulating the output current $I_O$, and the level of the output current $I_O$ is correlated to the current-control signal $S_I$. In other words, the switching signal $V_{PWM}$ is modulated in response to the reference signal $V_{REF1}$, and the level of the output current $I_O$ is correlated to the reference signal $V_{REF1}$.

FIG. 4 is a preferred embodiment of the integrator in accordance with the present invention. An amplifier 510, a resistor 511 and a transistor 512 construct a first V-to-I converter to generate a first current $I_{512}$ in response to the current-waveform signal $V_B$. A positive input of the amplifier 510 is supplied with the current-waveform signal $V_B$. A negative input of the amplifier 510 is coupled to a source terminal of the transistor 512 and one terminal of the resistor 511. The other terminal of the resistor 511 is Coupled to the ground. An output of the amplifier 510 is coupled to a gate terminal of the transistor 512. A drain terminal of the transistor 512 generates the first current $I_{512}$.

Transistors 514, 515 and 519 form a first current mirror for producing a current $I_{515}$ and a current $I_{519}$ by mirroring the first current $I_{512}$. Source terminals of the transistors 514, 515 and 519 of the first current mirror are coupled to the supply voltage $V_{CC}$. Gate terminals of the transistors 514, 515, 519 and drain terminals of the transistors 512, 514 are connected together. Drain terminals of the transistors 515 and 519 generate the current $I_{515}$ and $I_{519}$ respectively. Transistors 516 and 517 form a second current mirror for generating a current $I_{517}$ by mirroring the current $I_{515}$. Source terminals of the transistors 516 and 517 of the second current mirror are coupled to the ground. Gate terminals of the transistors 516, 517 and drain terminals or the transistors 516, 515 are connected together. A drain terminal of the transistor 517 generates the current $I_{517}$.

An amplifier 530, a resistor 531 and a transistor 532 form a second V-to-I converter for generating a second current $I_{532}$ in response to the current-waveform signal $V_A$. A positive input of the amplifier 530 is supplied with the current-waveform signal $V_A$. A negative input of the amplifier 530 is coupled to a source terminal of the transistor 532 and one terminal of the resistor 531. The other terminal of the resistor 531 is coupled to the ground. An output of the amplifier 530 is coupled to a gate terminal of the transistor 532. A drain terminal of the transistor 532 generates the second current $I_{532}$. Transistors 534 and 535 form a third current mirror for producing a current $I_{535}$ by mirroring the second current $I_{532}$. Source terminals of the transistors 534 and 535 of the third current mirror are coupled to the supply voltage $V_{CC}$. Gate terminals of the transistors 534, 535 and drain terminals of the transistors 532, 534 are connected together. A drain terminal of the transistor 535 generates the current $I_{535}$.

Transistors 536 and 537 develop a fourth current mirror for producing a current $I_{537}$ in response to the current $I_{535}$ and the current $I_{517}$. Source terminals of the transistors 536 and 537 of the fourth current mirror are coupled to the ground. Gate terminals of the transistors 536, 537 and drain terminals of the transistors 536, 535 are connected together. The drain terminal of the transistor 536 and a drain terminal of the transistor 537 generate a current $I_{536}$ and the current $I_{537}$ respectively. The current $I_{536}$ can be expressed by $I_{536}=I_{535}-I_{517}$. The geometric size of the transistor 536 is twice the size of the transistor 537. Therefore the current $I_{537}$ is the current $I_{536}$ divided by 2. Transistors 538 and 539 form a fifth current mirror for generating a current $I_{539}$ by mirroring the current $I_{537}$. Source terminals of the transistors 538 and 539 of the fifth current mirror are coupled to the supply voltage $V_{CC}$. Gate terminals of the transistors 538, 539 and drain terminals of the transistors 538, 537 are connected together. A drain terminal of the transistor 539 generates the current $I_{539}$. The drains of the transistor 519 and the transistor 539 are coupled together for generating the average current signal $I_{AVG}$ by summing the current $I_{519}$ and the current $I_{539}$. A current feedback signal $V_X$ is therefore generated at the drain terminals of the transistor 519 and the transistor 539. The resistor 511, the resistor 531 and a capacitor 570 determine the time constant of the integrator 500, and the resistor 531 is correlated to the resistor 511.

A switch 550 is coupled between the drain terminal of the transistor 519 and the capacitor 570. The switch 550 is controlled by the discharge-time signal $S_{DS}$ and turned on only during the period of the discharge-time of the secondary side switching current $I_S$. A transistor 560 is coupled to the capacitor 570 in parallel to discharge the capacitor 570. The transistor 560 is turned on by the clear signal CLR. The integrator 500 further includes a sample-and-hold circuit formed by a sample switch 551 and an output capacitor 571. The sample switch 551 is coupled between the capacitor 570 and the output capacitor 571. The switch 551 controlled by the sample signal $S_P$ serves to periodically sample the voltage across the capacitor 570 to the output capacitor 571. The current signal $V_Y$ is therefore generated across the output capacitor 571. The sample-and-hold circuit is coupled to sample the current feedback signal $V_X$ for generating the current-control signal $S_I$ (as shown in FIG. 3). The current feedback signal $V_X$ is correlated to the switching current $I_P$ of the offline transformer 10 (as shown in FIG. 1). In other words, the sample-and-hold circuit is coupled to sample the current input signal $V_{IP}$ (as shown in FIG. 1) for generating the current-control signal $S_I$. As shown in FIG. 3, the sample-and-hold circuit will stop sampling the current feedback signal $V_X$ once the input voltage $V_{IN}$ of the drive circuit is lower than the low-voltage threshold $V_{TH}$. In other words, the sample-and-hold circuit will stop sampling the current feedback signal $V_X$ once the AC input $V_{AC}$ (as shown in FIG. 2) is lower than the low-voltage threshold $V_{TH}$. The AND gate 710 generates the sample signal $S_P$ for sampling of the current feedback signal $V_X$.

Figure 5:
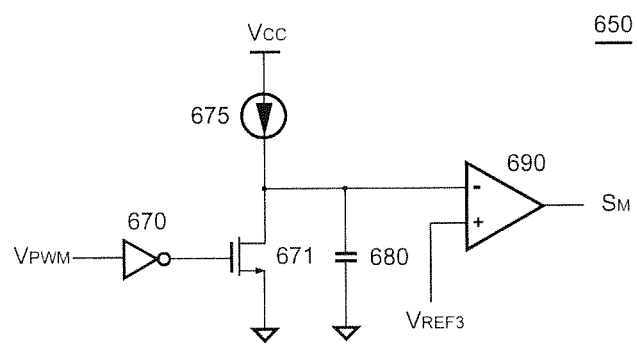
FIG. 5 shows a preferred embodiment of the maximum duty circuit in accordance with the present invention.

FIG. 5 shows a preferred embodiment of the maximum duty circuit 650 in accordance with the present invention. The maximum duty circuit 650 includes an inverter 670, a transistor 671, a current source 675, a capacitor 680 and a comparator 690. A gate terminal of the transistor 671 receives the switching signal $V_{PWM}$ through the inverter 670. The switching signal $V_{PWM}$ is coupled to control the transistor 671. The current source 675 is coupled between the supply voltage $V_{CC}$ and a drain terminal of the transistor 671. A source terminal of the transistor 671 is coupled to the ground. The capacitor 680 is connected between the drain terminal of the transistor 671 and the ground. The transistor 671 is coupled to the capacitor 680 in parallel to discharge the capacitor 680 when the switching signal $V_{PWM}$ is disabled. The current source 675 is connected to the supply voltage $V_{CC}$ and is used to charge the capacitor 680 when the switching signal $V_{PWM}$ is enabled. The current source 675 and the capacitance of the capacitor 680 determine the pulse-width and the amplitude of the voltage across the capacitor 680. A negative input of the comparator 690 is coupled to the drain terminal of the transistor 671 and the capacitor 680. A reference signal $V_{REF3}$ is supplied to a positive input of the comparator 690. An output of the comparator 690 generates the maximum duty signal $S_M$. To set up the reference signal $V_{REF3}$ appropriately, the maximum duty circuit 650 can be utilized to limit the maximum-duty of the switching signal $V_{PMW}$ under 50%.

Figure 6:
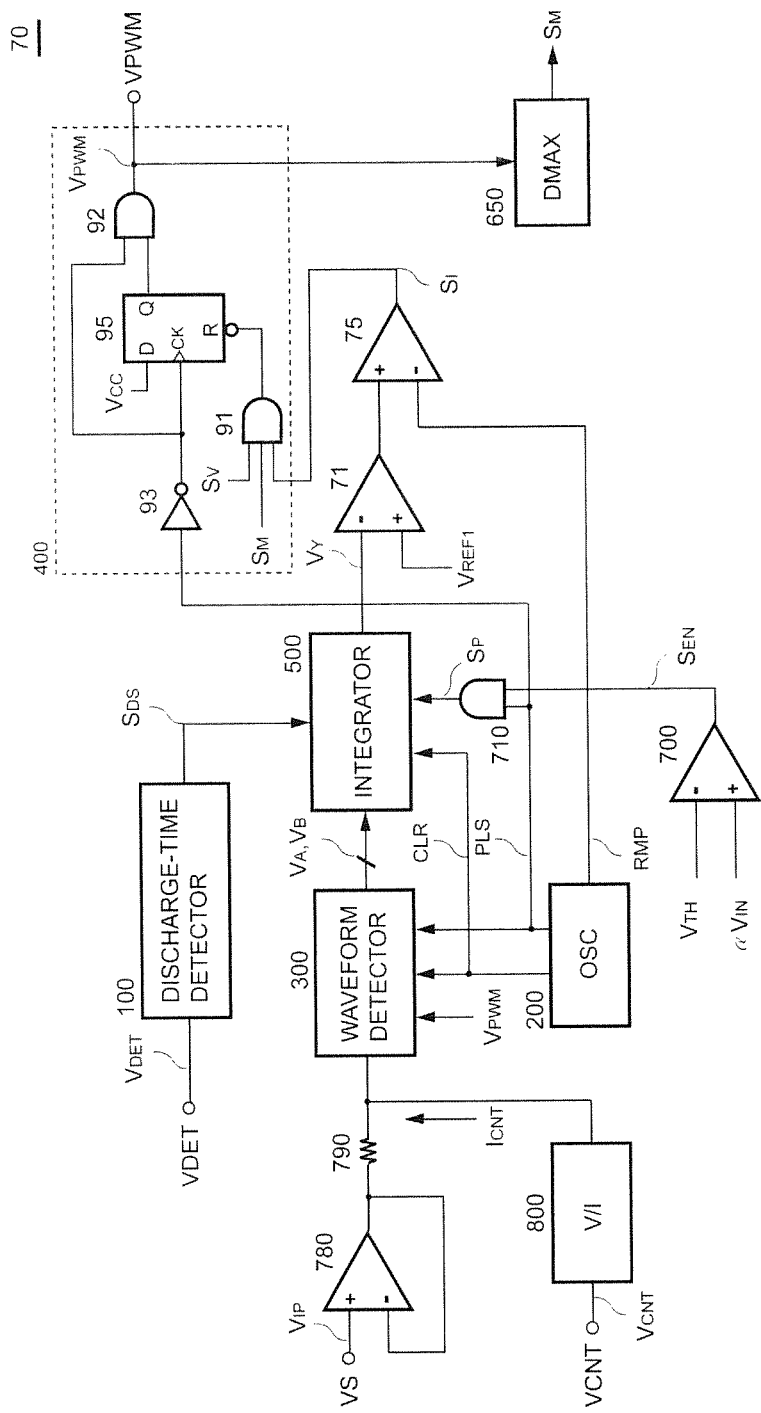
FIG. 6 is another preferred embodiment of the controller in accordance with the present invention.

FIG. 6 is another preferred embodiment of the controller 70 in accordance with the present invention. The controller 70 generates the switching signal $V_{PWM}$ coupled to switch the offline transformer 10 for generating the current input signal $V_{IP}$ (as shown in FIG. 1). A positive input of a buffer amplifier 780 receives the current input signal $V_{IP}$. A negative input of the buffer amplifier 780 is coupled to its output. A voltage-to-current converter 800 receives the programmable signal $V_{CNT}$ to generate a programmable current $I_{CNT}$. A resistor 790 is coupled between the output of the buffer amplifier 780 and the output of the voltage-to-current converter 800. The resistor 790 and the output of the voltage-to-current converter 800 are further coupled to the input of the waveform detector 300. The programmable current $I_{CNT}$ further coupled to the current-sense terminal VS (as shown in FIG. 1) via the resistor 790 and the buffer amplifier 780 for modulating the current input signal $V_{IP}$. Hence, the programmable signal $V_{CNT}$ generated at the input terminal VCNT is coupled to modulate the current input signal $V_{IP}$. Referring to the FIG. 3, the current input signal $V_{IP}$ is further coupled to generate the current-control signal $S_I$. The current input signal $V_{IP}$ is correlated to the switching current $I_P$ of the offline transformer 10 and the programmable signal $V_{CNT}$. The switching signal $V_{PWM}$ is controlled in response to the current-control signal $S_I$, thus the level of the output current $I_O$ is correlated to the current-control signal $S_I$.

Figure 7:
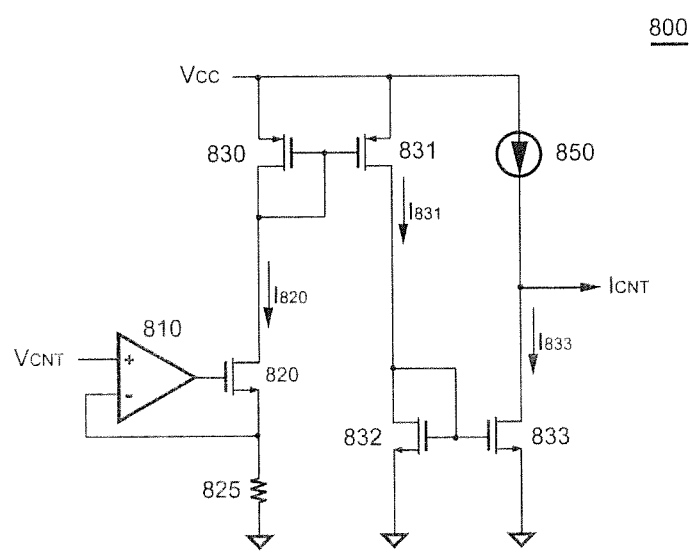
FIG. 7 shows a preferred embodiment of the voltage-to-current converter in accordance with the present invention.

FIG. 7 shows a preferred embodiment of the voltage-to-current converter 800 in accordance with the present invention. The voltage-to-current converter 800 comprises an amplifier 810, a resistor 825, a transistor 820, a first current mirror formed by transistors 830, 831, a current source 850, a second current mirror formed by transistors 832, 833. A positive input of the amplifier 810 receives the programmable signal $V_{CNT}$. A negative input of the amplifier 810 is coupled to a source terminal of the transistor 820 and one terminal of the resistor 825. The other terminal of the resistor 825 is coupled to the ground. An output of the amplifier 810 is coupled to a gate terminal of the transistor 820. A drain terminal of the transistor 820 is coupled to the first current mirror and generates a current $I_{820}$.

The first current mirror generates a current $I_{831}$ by mirroring the current $I_{820}$. Source terminals of the transistors 830 and 831 of the first current mirror are coupled to the supply voltage $V_{CC}$. Gate terminals of the transistors 830, 831 and drain terminals of the transistors 830, 820 are connected together. A drain terminal of the transistor 831 generates the current $I_{831}$. The second current mirror is coupled to the drain terminal of the transistor 831 to generate a current $I_{833}$ by mirroring the current $I_{831}$. Source terminals of the transistors 832 and 833 of the second current mirror are coupled to the ground. Gate terminals of the transistors 832, 833 and drain terminals of the transistors 832, 831 are connected together. A drain terminal of the transistor 833 generates the current $I_{833}$. The current source 850 is coupled from the supply voltage $V_{CC}$ to the drain terminal of the transistor 833. The drain terminal of the transistor 833 further outputs the programmable current $I_{CNT}$. As shown in FIG. 6, the programmable current $I_{CNT}$ is to modulate the current input signal $V_{IP}$. The current input signal $V_{IP}$ is correlated to the switching current $I_P$ of the offline transformer 10 and the programmable signal $V_{CNT}$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A LED drive circuit comprising:
   a controller generating a switching signal coupled to switch a magnetic device for generating an output current to drive a plurality of LEDs; and
   a programmable signal coupled to regulate a current-control signal of the controller;
   wherein the switching signal is modulated in response to the current-control signal for regulating the output current, and the level of the output current is correlated to the current-control signal.

2. The LED drive circuit as claimed in claim 1, wherein the switching signal is coupled to control a switching current of the magnetic device; the magnetic device is an offline transformer.

3. The LED drive circuit as claimed in claim 1, wherein the programmable signal is generated in response to an AC input of the LED drive circuit.

4. The LED drive circuit as claimed in claim 1, wherein the controller is a primary-side controller that is coupled to switch a primary winding of the magnetic device.

5. The LED drive circuit as claimed in claim 1, wherein the controller comprises a sample-and-hold circuit to sample a current feedback signal for generating the current-control signal; the current feedback signal is correlated to a switching current of the magnetic device; wherein the sample-and-hold circuit stops sampling the current feedback signal once an AC input of the LED drive circuit is lower than a low-voltage threshold.

6. A LED circuit comprising:
   a controller generating a switching signal coupled to switch a magnetic device for generating an output current to drive a plurality of LEDs; and
   a programmable signal coupled to control a reference signal of the controller;
   wherein the switching signal is modulated in response to the reference signal, and the level of the output current is correlated to the reference signal.

7. The LED circuit as claimed in claim 6, wherein the magnetic device is an offline transformer.

8. The LED circuit as claimed in claim 6, wherein the programmable signal is generated in response to an AC input of the LED circuit.

9. The LED circuit as claimed in claim 6, wherein the controller comprises a sample-and-hold circuit to sample a current feedback signal: the current feedback signal is correlated to a switching current of the magnetic device; wherein the sample-and-hold circuit stops sampling the current feedback signal once an input voltage of the LED circuit is lower than a low-voltage threshold.

10. A LED driver comprising:
    a controller generating a switching signal coupled to switch a transformer for generating an output current connected to drive a plurality of LEDs; and
    a programmable signal coupled to modulate a current input signal;
    wherein the switching signal is controlled in response to the current input signal for regulating the output current.

11. The LED driver as claimed in claim 10, wherein the controller is a primary-side controller that is coupled to switch a primary winding of the transformer.

12. The LED driver as claimed in claim 10, wherein the controller comprises a sample-and-hold circuit coupled to sample the current input signal; the sample-and-hold circuit stops sampling the current input signal once an input voltage of the LED driver is lower than a low-voltage threshold.

13. A LED drive circuit comprising:
- a controller generating a switching signal coupled to switch a transformer for generating an output current to drive a plurality of LEDs; and
- a programmable signal generated in response to an input of the LED drive circuit;
- wherein the switching signal is modulated in response to the programmable signal for controlling the output current.

14. The LED drive circuit as claimed in claim 13, wherein the controller is for providing a feed-forward control to control the output current.

15. The LED drive circuit as claimed in claim 13, wherein the controller is a primary-side controller that is coupled to switch a primary winding of the transformer.

16. A LED drive circuit comprising:
- a controller, generating a switching signal coupled to switch a magnetic device for generating an output current to drive at least a LED (Light Emitting Diode);
- an input circuit, receiving a programmable signal correlated to an input of the LED drive circuit to generate a programmable current; wherein the programmable current is coupled to control a current input signal which is correlated to a switching current of the magnetic device; and
- a comparison circuit, comparing a signal sourced from an oscillator and a voltage potential generated by a current-control loop for generating a current-control signal;
- wherein the switching signal is controlled in response to the current-control signal for regulating the output current, and a level of the output current is correlated to the current-control signal.

17. The LED drive circuit as claimed in claim 16, wherein the voltage potential is generated in response to the programmable current.

18. The LED drive circuit as claimed in claim 16, wherein the voltage potential is generated in response to the current input signal.

19. The LED drive circuit as claimed in claim 16, wherein the input of the LED drive circuit is a DC (Direct Current) signal.

20. The LED drive circuit as claimed in claim 16, wherein the input of the LED drive circuit is a rectified AC (Alternating Current) signal.

21. The LED drive circuit as claimed in claim 16, wherein the controller is a primary-side controller that is coupled to switch a primary winding of the magnetic device.

22. A LED drive circuit comprising:
- A primary-side controller configured for coupling to a switch, a magnetic device, and an input source to generate a switching signal to drive the switch to generate an output current to drive at least one LED;
- wherein the primary side controller is configured to generate a programmable signal in response to a signal received from the input source and the switching signal is controlled in response to the programmable signal to regulate the output current that drives the at least one LED.

23. The LED drive circuit of claim 22, wherein the primary side controller further comprises a comparator configured to compare a oscillator signal to a current-control signal to control the switching signal, wherein the current-control signal is correlated to the programmable signal.

* * * * *